(12) United States Patent
Apparao et al.

(10) Patent No.: US 7,526,728 B2
(45) Date of Patent: *Apr. 28, 2009

(54) METHOD AND SYSTEM FOR MANAGING DIGITAL ASSETS

(75) Inventors: Vidur Apparao, Palo Alto, CA (US);
John Bandhauer, Aptos, CA (US);
Christopher Robert Waterson, San Francisco, CA (US)

(73) Assignee: AOL LLC, Dulles, VA (US)

( * ) Notice: Subject to any disclaimer, the term of this patent is extended or adjusted under 35 U.S.C. 154(b) by 285 days.

This patent is subject to a terminal disclaimer.

(21) Appl. No.: 11/428,350

(22) Filed: Jun. 30, 2006

(65) Prior Publication Data

US 2007/0005389 A1    Jan. 4, 2007

Related U.S. Application Data

(63) Continuation of application No. 10/631,343, filed on Jul. 30, 2003, now Pat. No. 7,082,573.

(30) Foreign Application Priority Data

Jul. 23, 2004    (WO) .............. PCT/US2004/023686

(51) Int. Cl.
*G06F 3/00* (2006.01)
*G06F 3/048* (2006.01)

(52) U.S. Cl. ...................... 715/745; 715/738; 715/739; 715/744; 715/760; 715/853

(58) Field of Classification Search .................... 705/1; 707/E17.009; 715/745, 744, 853, 739, 760, 715/733, 738
See application file for complete search history.

(56) References Cited

U.S. PATENT DOCUMENTS 5,748,512 A    5/1998  Vargas (Continued)

FOREIGN PATENT DOCUMENTS

EP    843 269    5/1998

(Continued)

OTHER PUBLICATIONS

Li et al., "Web-based Multimedia Retrieval: Balancing out between Common Knowledge and Personalized Views", published in Proceedings of 2nd International Conference on Web Information System Engineering, pp. 92-101, Kyoto, Japan, 2001.*

*Primary Examiner*—Kieu D Vu
*Assistant Examiner*—Andrew Tank
(74) *Attorney, Agent, or Firm*—Michael A. Glenn; Glenn Patent Group

(57) ABSTRACT

A digital asset management system and method is responsive to user interactions with digital assets. A ranking of digital assets is generated based upon user interaction, to reflect the value of the digital assets to the user. The ranking is based in part on access frequency and recency, and the number and types of uses of the digital assets. An access hierarchy is derived from the ranking, wherein higher ranked digital assets are more easily accessed than the lower ranked digital assets. Different types of uses can be distinguished, so that some types of uses imbue an asset with greater value than others. The types of uses may include passive viewing or playback, file sharing, transport, and editing. Subjective values may be assigned by the user to each digital asset that can be factored into the ranking independently of usage patterns. A volatility-dampening attribute moderates volatility in the access hierarchy.

30 Claims, 7 Drawing Sheets

A

| | Session 1 | Session 2 |
|---|---|---|
| | Personal Score 7 | Personal Score 7 |
| | 3 Viewings | 2 Viewings |
| | 5 Edits | — |
| | 1 Print Job | 1 Print Job |
| | Total Score 142 | Total Score 32 |

B

| | Session 1 | Session 2 |
|---|---|---|
| | Personal Score 6 | Personal Score 6 |
| | 5 Viewings | 4 Viewings |
| | 1 Edit | 2 Edits |
| | 3 Print Jobs | 1 Print Job |
| | Total Score 91 | Total Score 91 |

C

| | Session 1 | Session 2 |
|---|---|---|
| | Personal Score 5 | Personal Score 5 |
| | 2 Viewings | 1 Viewing |
| | — | 1 Edit |
| | 1 Print Job | — |
| | Total Score 30 | Total Score 35 |

U.S. PATENT DOCUMENTS

| | | | |
|---|---|---|---|
| 6,018,619 A * | 1/2000 | Allard et al. | 709/224 |
| 6,037,934 A | 3/2000 | Himmel et al. | 345/335 |
| 6,049,812 A | 4/2000 | Bertram et al. | 707/516 |
| 6,069,625 A * | 5/2000 | Nielsen | 715/866 |
| 6,088,707 A | 7/2000 | Bates et al. | |
| 6,182,113 B1 | 1/2001 | Narayanaswami | 709/203 |
| 6,223,178 B1 | 4/2001 | Himmel et al. | 707/10 |
| 6,243,091 B1 | 6/2001 | Berstis | 345/349 |
| 6,400,381 B1 | 6/2002 | Barrett et al. | |
| 6,408,316 B1 | 6/2002 | Himmell et al. | 707/501.1 |
| 6,415,368 B1 * | 7/2002 | Glance et al. | 711/158 |
| 6,460,058 B2 | 10/2002 | Koppolu et al. | 707/501.1 |
| 6,486,891 B1 | 11/2002 | Rice | 345/738 |
| 6,493,702 B1 | 12/2002 | Adar et al. | 707/3 |
| 6,549,896 B1 | 4/2003 | Candan et al. | 707/2 |
| 7,082,573 B2 * | 7/2006 | Apparao et al. | 715/745 |
| 7,222,293 B1 * | 5/2007 | Zapiec et al. | 715/205 |
| 7,343,378 B2 * | 3/2008 | Marcjan | 707/101 |
| 7,346,668 B2 * | 3/2008 | Willis | 709/219 |
| 2001/0008399 A1 | 7/2001 | Oosterholt et al. | 345/418 |
| 2002/0075302 A1 * | 6/2002 | Simchik | 345/745 |
| 2002/0143894 A1 * | 10/2002 | Takayama | 709/217 |
| 2004/0019849 A1 | 1/2004 | Weng et al. | |
| 2004/0073918 A1 | 4/2004 | Ferman et al. | |

FOREIGN PATENT DOCUMENTS

| | | |
|---|---|---|
| EP | 1 185 028 | 3/2002 |
| EP | 945 811 | 1/2003 |
| WO | WO 98/57436 | 12/1998 |

* cited by examiner

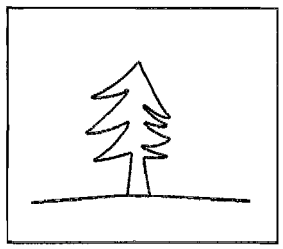
A
| Session 1 | Session 2 |
|---|---|
| Personal Score 7 | Personal Score 7 |
| 3 Viewings | 2 Viewings |
| 5 Edits | — |
| 1 Print Job | 1 Print Job |
| Total Score 142 | Total Score 32 |
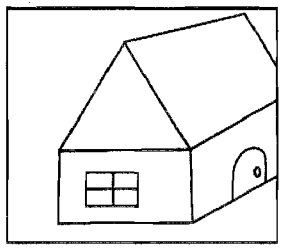
B
| Session 1 | Session 2 |
|---|---|
| Personal Score 6 | Personal Score 6 |
| 5 Viewings | 4 Viewings |
| 1 Edit | 2 Edits |
| 3 Print Jobs | 1 Print Job |
| Total Score 91 | Total Score 91 |
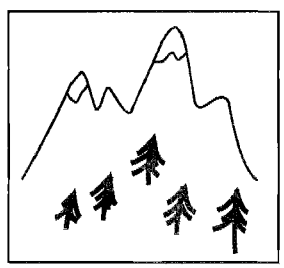
C
| Session 1 | Session 2 |
|---|---|
| Personal Score 5 | Personal Score 5 |
| 2 Viewings | 1 Viewing |
| — | 1 Edit |
| 1 Print Job | — |
| Total Score 30 | Total Score 35 |
Fig. 5

A

| Web Site A | Session 1 | Session 2 |
|---|---|---|
| | Most Recent - 1 Day | Most Recent - 0 Day |
| | 4 Visits/Day | 1.5 Visits/Day |
| | Avg. Duration - 5 Min. | Avg. Duration - 10 Min. |
| | Edited/Shared - 1 | Edited/Shared - 0 |
| | Personal Score - 8 | Personal Score - 8 |
| | Total Score : 56 | Total Score : 45.5 |

B

| Web Site B | Session 1 | Session 2 |
|---|---|---|
| | Most Recent - 3 Day | Most Recent - 1 Day |
| | 0.5 Visits/Day | 2 Visits/Day |
| | Avg. Duration - 10 Min. | Avg. Duration - 3 Min. |
| | Edited/Shared - 0 | Edited/Shared - 2 |
| | Personal Score - 5 | Personal Score - 5 |
| | Total Score : 31.5 | Total Score : 49 |

C

| Web Site C | Session 1 | Session 2 |
|---|---|---|
| | Most Recent - 3 Day | Most Recent - 0 Day |
| | 1 Visits/Day | 5 Visits/Day |
| | Avg. Duration - 6 Min. | Avg. Duration - 5 Min. |
| | Edited/Shared - 0 | Edited/Shared - 0 |
| | Personal Score - 4 | Personal Score - 4 |
| | Total Score : 29 | Total Score : 49 |

Fig. 6

METHOD AND SYSTEM FOR MANAGING DIGITAL ASSETS

CROSS REFERENCE TO RELATED APPLICATION

This application is a Continuation of and claims priority to U.S. application Ser. No. 10/631,343, originally entitled A Method and System for Managing Digital Assets, filed 30 Jul. 2003, now U.S. Pat. No. 7,082,573 which is incorporated herein in its entirety by this reference thereto.

This Application also claims foreign priority under 35 U.S.C. 119 to PCT patent application Ser. No. PCT/USO4/23686, filed 23 Jul 2004, which is incorporated herein in its entirety by this reference thereto.

BACKGROUND OF THE INVENTION

1. Technical Field

The invention relates to the field of data storage and management. More particularly, the invention relates to a method and system for managing digital assets.

2. Description of the Prior Art

During the ordinary course of downloading, saving, and retrieving digital data on a device such as a personal computer, a user is regularly faced with the challenge of how to store newly acquired data in such a manner that the user can most effectively access such data in the future. Over time, as the user progressively accumulates more data on the computer, the difficulty in organizing data storage can become increasingly acute.

For example, a user may have a collection of digital images stored on the computer. If the user organizes the images into a separate folder devoted exclusively to digital photographs and other images the user eliminates the aggravation of having to sort through music files or text files to find a desired digital image. However, as the collection of images grows it becomes increasingly burdensome to organize the storage of files in such a manner that the user can quickly and efficiently access images of interest.

One storage strategy the user might employ is to create folders organized according to user-assigned criteria, such as by source, date, or subject matter. One benefit of this approach is that the organization makes sense to the user because he dictated the underlying criteria. One downside, however, is that creating and maintaining folders in this manner is a labor-intensive practice. Furthermore, as the number of different folders increases, the organizational complexity can hinder the rapid acquisition of a desired image. This organizational strategy is also relatively inflexible. If the user decides to change the organizational criteria for the folders, then all of the original organizational efforts must be duplicated using new criteria.

Another storage strategy is to organize all of the digital images by date of creation. Storage by date of creation can be accomplished automatically without requiring the user to organize the storage manually. Furthermore, no matter how many images are stored, the organization of the stored images is relatively simple. However, as the number of images grows, it becomes increasingly laborious for the user to access a desired image, especially if the user cannot recall its creation date. Also, the date of creation might not have any correlation to the value or desirability of an image to the user.

What is needed is a method and a system for managing digital assets that reflects the subjective worth of the digital assets to the user automatically, based on the user's manipulation of the digital assets.

SUMMARY OF THE INVENTION

In one embodiment of the invention, a method and a system are provided for managing digital assets based on a user's pattern of interaction with the digital assets. The user's interaction with the digital assets is monitored to track the extent of use and the specific types of use of the digital assets, which are stored in memory. A ranking module ranks the digital assets based on the nature and extent of the user's interactions with the digital assets. An access hierarchy is created based on the ranking so that digital assets more highly ranked are stored in memory in such a manner that they are more easily accessed than lower ranked digital assets. The ranking can be based on, for example, the types of uses made, and the frequency, recency and number of uses made of the digital assets. The different types of uses considered in ranking the digital assets include, but are not limited to passive playback or viewing, file sharing, transport, and editing. Additionally, the user can assign a value to each digital asset that represents the subjective worth of each digital asset to the user. These values can be factored in to rank the digital assets.

In one embodiment the invention, a technique is provided for dampening volatility when re-ranking of digital assets. In this embodiment, scores are assigned to the digital assets based on the usage pattern for each digital asset. Subsequently, the digital assets are re-ranked only if the score of one of the digital assets exceeds the score of another previously higher ranked digital asset by a predetermined threshold. Optionally, the user can set the threshold according to the user's subjective tolerance for volatility.

In another embodiment, the invention is used to manage digital images. Ranking of the digital images can be performed to distinguish the different types of user manipulations. For example, different scores can be assigned for viewing, sharing, editing, and transporting (importing or exporting) digital images.

Another embodiment of the invention manages digital audio files. Ranking of the digital audio files can also be performed to distinguish different types of user manipulations so that different scores can be assigned for playback, sharing, transporting, or editing of an audio file.

Another embodiment of the invention manages Uniform Resource Locators (URL). One aspect of this embodiment enables the user to access multiple devices on a network by storing the navigation history of a Web browsing session at a location that is accessible to each of the network devices. When the user initiates a second Web browsing session on a network device other than the one used during the first session, the navigation history for the first session is downloaded to the second network device. Storing the navigation history at a network-wide accessible location enables the use of the access hierarchy from multiple locations on the network.

One advantage of the invention lies in its ability to react to a user's changing preferences with regard to the digital assets over time, as identified by the user's changing patterns of use and access of those digital assets. For example, as the user begins to access a digital asset more frequently, that digital asset is stored so as to enable more efficient access to that digital asset.

Another advantage of the invention is that it can be economically implemented because the monitoring and ranking of the digital assets can be accomplished without the need for substantial processing requirements.

Another advantage of the invention is that the re-ranking of digital assets can be performed to modulate the volatility in the ranking of the digital assets in the access hierarchy.

Another advantage of the invention is that the user is able to obtain the benefits of the access hierarchy from any number of devices on a computer network.

BRIEF DESCRIPTION OF THE DRAWINGS

FIG. 5 is a schematic diagram illustrating the operation of an embodiment of the invention for managing digital images;

FIG. 6 is a schematic diagram illustrating the operation of an embodiment of the invention for managing URL's in a web navigation history.

DETAILED DESCRIPTION OF THE INVENTION

Figure 1:
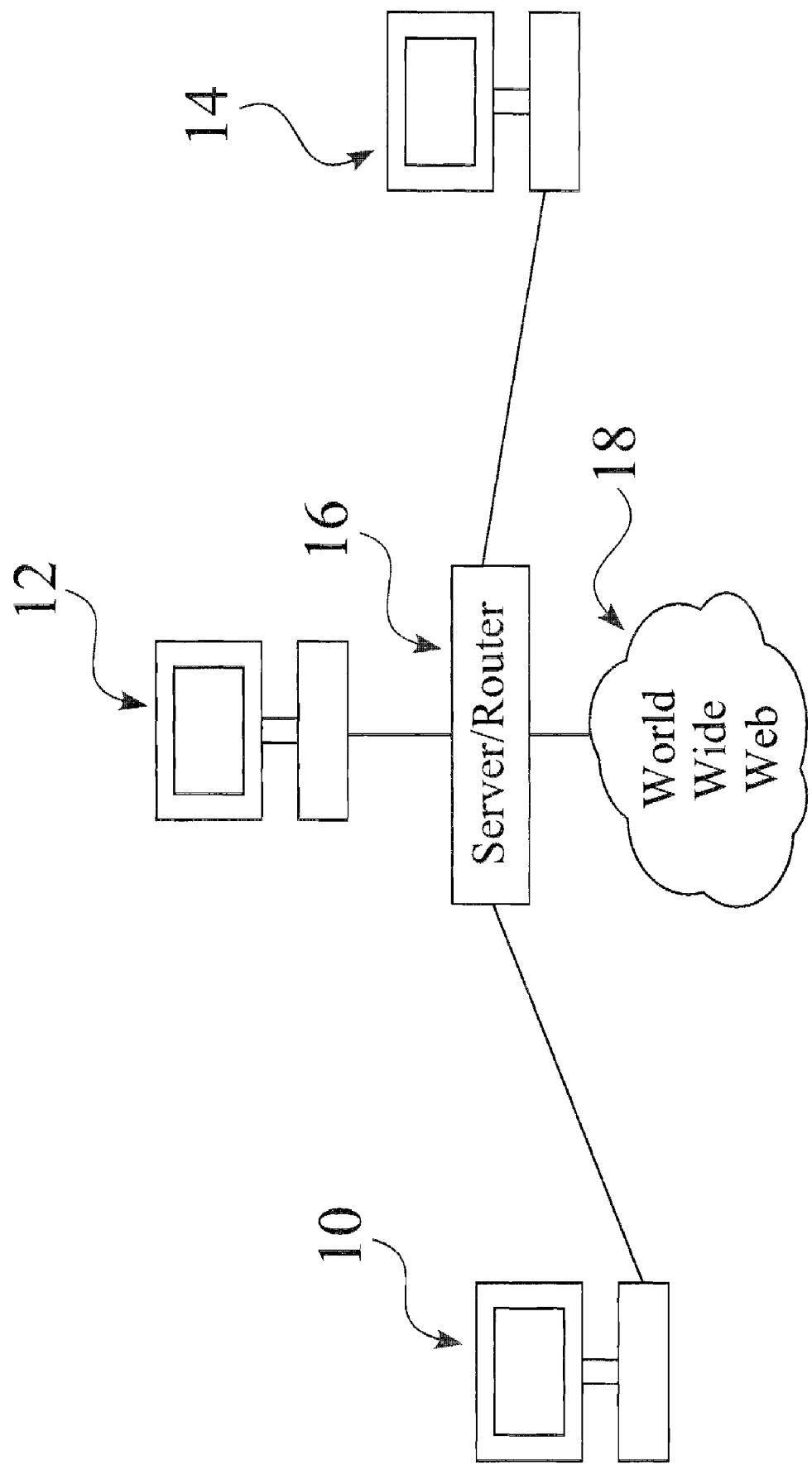
FIG. 1 is a schematic diagram of a computer network within which the invention may be practiced.

In one embodiment, the invention operates in the environment of a computer network to facilitate the management of digital assets in a manner that is responsive to a user's interactions with the digital assets. As shown in FIG. 1, first, second, and third computers 10, 12, and 14 are interconnected via a server/router 16. Any number of different network devices can be substituted for the personal computers, including CD, MP3, and DVD players and the like. A router can be substituted for the server/router 16 as well. The server/router is connected to a publicly accessible network, such as the Internet 18.

Figure 2:
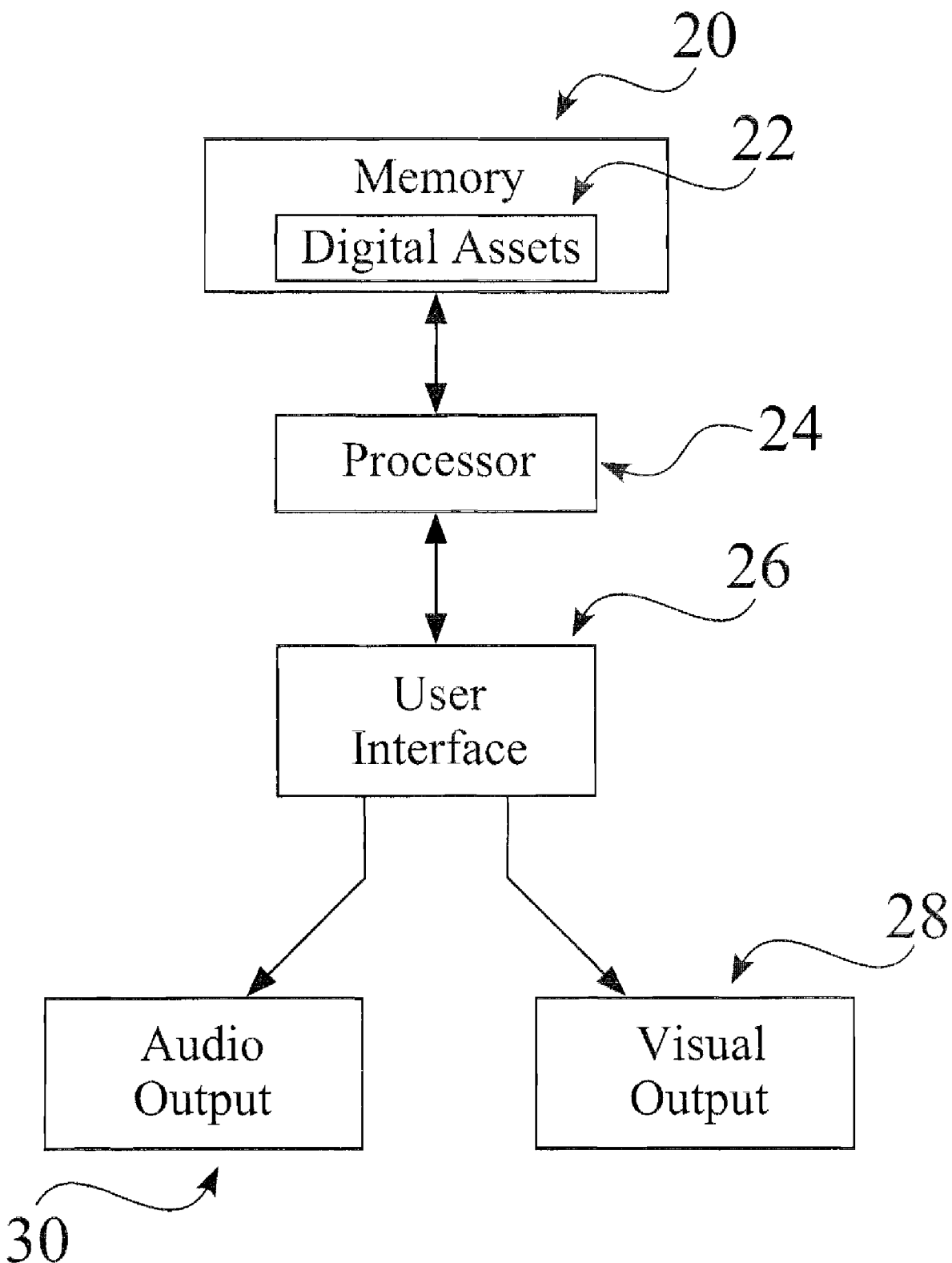
FIG. 2 is a block diagram of one embodiment of the invention showing components of a device connected to the network illustrated in FIG. 1.

With reference to FIG. 2, the components of the presently preferred system for managing digital assets comprise a memory 20 that is used to store digital assets 22. The memory can be any of a number of well-known types of memory, including magnetic media, random access memory (RAM), optical media, or the like. In the embodiment illustrated in FIG. 1, the memory 20 can be resident in one of the personal computers 10-14, it can be located on the server/router 16, or it can be distributed amongst the different networked devices. In the preferred embodiment, the memory is commonly accessible to multiple networked devices. For example, if the memory 20 is resident on the first personal computer 10, it is preferred that second and third computers, 12 and 14 also have access to the memory 20.

Digital assets 22 are stored in the memory 20. Digital assets in the context of the invention include, but are not limited to, Uniform Resource Locators (URL), and digital, audio, or text files. A processor 24 is provided for accessing and manipulating the digital assets 22. The function of the processor can be provided by hardware, software, or a combination of both. A user interface 26 is provided to enable a user to access and manipulate the digital assets. The user interface can include a keyboard, mouse, or like device. The different types of user manipulations of the digital assets possible with the invention include, but are not limited to viewing, editing, or transport of digital image files or digital audio files. Additional user manipulations include activation, sharing, or transport of URL's, i.e. by sending a link attached in an email. An audio output 30, such as a set of audio speakers, and a visual output 28, such as a monitor screen, are provided to present digital audio and image files to the user.

Figure 3:
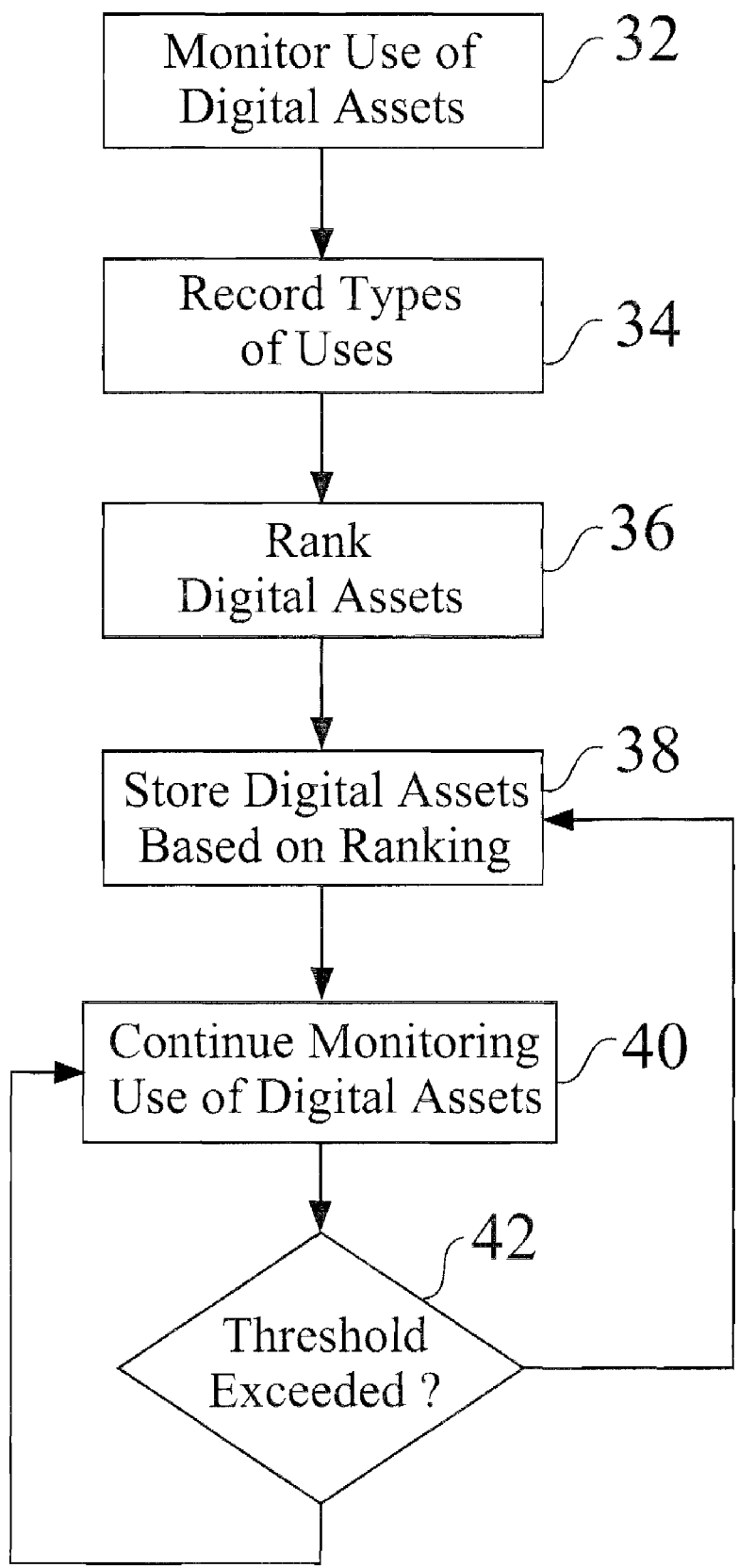
FIG. 3 is a flow diagram illustrating the method for managing digital assets according to the invention.
Figure 4:
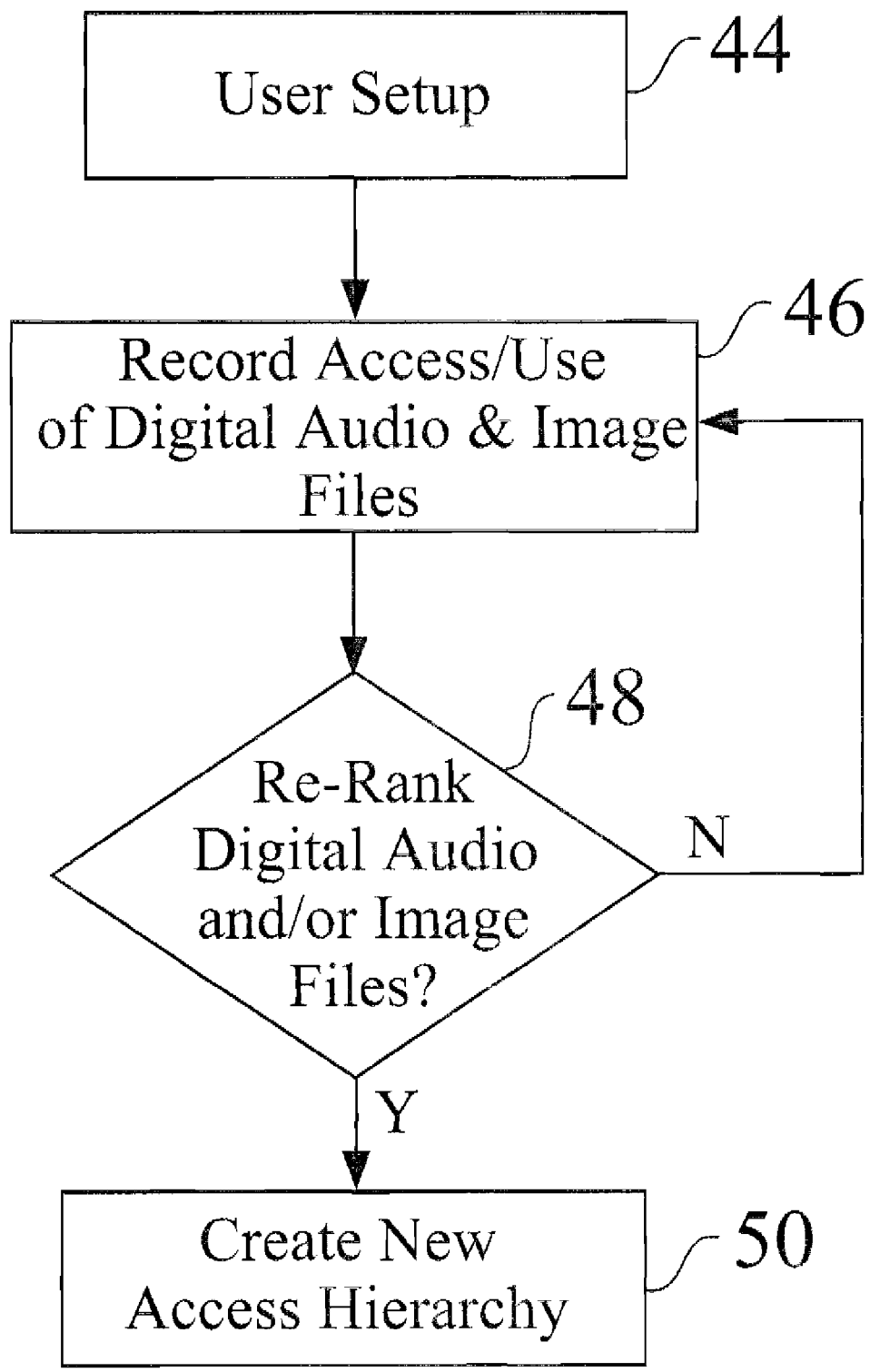
FIG. 4 is a flow diagram illustrating a method for managing URL's in a navigation history according to the invention.

FIG. 3 illustrates the generic process flow for a method for managing digital assets according to the invention. The method includes the step 32 of monitoring the user's manipulation of the digital assets 22. This step includes identifying the specific type of manipulation performed when the user accesses a digital asset. For example, step 22 preferably differentiates between editing, sharing, transporting (sending or receiving over the network), and passive viewing of a file. In step 34 a record is made of the specific types of use made for each digital asset. By making this record, it is possible to identify which digital assets are most frequently accessed and/or manipulated by the user.

In step 36, the digital assets are ranked based, at least in part, on the usage record made in step 34. The ranking takes into account the frequency, recency, and number of uses for each digital asset. In a preferred embodiment, the ranking step 36 also includes referencing a table of user values assigned to the different digital assets. The user-assigned value reflects the subjective worth of a digital asset to the user. For example, if the user has a favorite digital asset, the user assigns a high user value to it to ensure that asset is easy to access, even if the user infrequently accesses it.

In a preferred embodiment step, the 36 also takes into account what type of user manipulations have been performed on the digital assets. This includes referencing a table of values assigned to the different user manipulations of the digital assets. This set of user-manipulation values reflects the relative importance of the different user-manipulations. For example, for digital images, editing might be assigned a higher value than simply viewing a digital image. The ranking step thus takes into account the frequency, recency, number of uses, types of uses, and the user assigned values for each to generate a score for each of the digital assets.

In step 38, the digital assets are stored in memory 20 based on the ranking generated in step 36. That is, an access hierarchy is created in which those digital assets that are most highly ranked are stored so that they are more readily accessed from memory 20 than those digital assets that are lower ranked. In this manner, the method automatically responds to digital asset usage patterns by storing the digital assets with the overall highest value so they are most easily accessed. Steps 36 and 38 can be performed periodically while the user is working in an application that uses the digital assets. Alternatively, these steps can be performed at the end of a user session in the application. As will be discussed more fully below, in some embodiments it is desirable to store the ranking information at a commonly accessible location on the network so that the user can efficiently access the highest value digital assets regardless of which device the user employs. In step 40, the process continues to monitor the use of digital assets.

One potential drawback to ranking the digital assets is that the ranking might become overly volatile. Excessive volatility would result in dramatic reshuffling of the ranking that does not necessarily correspond to the real value of the digital assets to the user. One measure that can partially counteract such volatility is the user-assigned value provided for each of the digital assets. A high user assigned value provided for a digital asset infrequently accessed, but highly valued by the user, can help to maintain a relatively high ranking, for such digital asset even in the absence of much use.

Another volatility dampening measure is provided by step 42. In the process of generating the ranking, a score is assigned to each digital asset based on the user-assigned value and usage of the digital assets, e.g. recency, frequency, total number of uses, and types of usage. Step 42 queries whether the score of any digital asset exceeds the score of another previously higher ranked digital asset by a predetermined threshold. If not, the ranking is left unchanged and the process returns to the monitoring at step 40. Only if the threshold is exceeded does the process move to storing the assets at step 38 based on the re-ranking of the assets at step 42. In a preferred embodiment, the threshold can be adjusted by the user according to the level of volatility acceptable to the user, e.g. by a user operated control in the system user interface, or it may be automatic/applied based upon a fixed value embedded in the system.

Management of Digital Image and Audio Files

In one embodiment, the digital asset management invention is used to manage digital files, such as digital image or audio files. Step 44 allows the user to configure the digital asset management system according to the user's specifications. This includes allowing the user to assign values to each of the files, whether audio or digital, that represent the subjective value of each file to the user. When the user first starts a collection of digital image files or audio files, he can choose to assign a user-value to each file. Thereafter, as the user adds more digital image and audio files, the user can be presented with the option of assigning a user-value to each newly added file. The user-assigned values enable the user to influence the ranking of the files regardless of how frequently the user access or manipulates them.

Preferably step 44 also allows the user to tailor digital asset management by modulating the volatility in the ranking of digital assets. As discussed above, ranking of digital assets is dictated in part by the frequency of the use of the assets. If the ranking is too sensitive to the frequency of use of the digital assets, the dramatic re-ranking of the digital assets may be disruptive to the user. The user can set a minimum threshold score differential that must be exceeded before one digital asset can be re-ranked ahead of a previously higher ranked digital asset. Alternatively, the user can rely on a default threshold setting.

In step 46, the user's activity is recorded with respect to the digital image and audio files. For example, for audio files this step includes recording whether the user merely played back an audio file, or edited, shared, transported, or received the audio file. The invention allows for a distinction between these user-activities so that some activities imbue the audio file with a higher value than others. For example, the act of editing an audio file might generate a higher score for a digital audio file than simply playing back the file. For a digital image file, the act of sharing the file with another network device might generate a higher score for that file than viewing or printing the image. The different user-activities associated with digital image files include, but are not limited to, editing, printing, sharing, viewing, transmitting and receiving. The relative values assigned to the different user-activities are a matter of choice for the user and are not critical to the invention.

In a preferred embodiment, the step 46 also includes recording the frequency, recency, and total number of user-activities with respect to the digital assets. The more recently the user viewed a digital image, the higher the score for that image would be. Likewise, the higher the frequency or total number of viewings (or any other activity), the higher the score for that digital image would be. The invention learns which digital assets are most important to the viewer based on the user's interaction with the digital assets. For example, the user might listen to a song saved in an audio file with great frequency for a time but then grow bored with it and subsequently rarely play it back. As the user's frequency of access decreases, the score of the audio file declines.

In step 48 a decision is made whether to re-rank the digital image and/or digital audio files based on their usage scores. FIG. 5 provides a simple example of a ranking decision according to the invention. Three digital image files A, B, and C are shown. In this example, the act of viewing is assigned a score of ten, the act of editing is assigned the score of twenty, the act of printing is assigned the score of five and each digital image file has a user-assigned personal score. Two separate user sessions (1 and 2) are shown. In session 1, the user assigned image A a personal score of seven, viewed image A three times, edited it five times, and printed it once for a total score of 142. In session 1, for image B the user assigned the image a personal score of six, viewed the image twice, edited it once, and printed it three times for a score of 91. For image C, in session 1 the user assigned the image a personal score of five, viewed it twice, and printed it once for a score of 30. At the end of session 1, the ranking of the digital images is A followed by B, with C being ranked the lowest.

After session 2, image A had a score of 32, image B had a score of 91, and image C had a score of 35. Assuming the minimum threshold for re-ranking the digital image files is a score differential of at least ten points between two different image files in a given session, the ranking after session 2 is B with a score of 91, A with a score of 32 followed by C with a score of 35. In this example, for C to have surpassed A in the rankings would have required image C to have scored at least ten points higher than image A, or higher than 42. Image B surpassed image A in the rankings because its score of 91 exceeded the score for image A by more than the ten-point minimum threshold. A simple example has been used here for illustrative purposes, but more sophisticated and well known score calculations and comparisons that account for frequency of use and total number of uses and recency of use can be used to rank digital assets.

An access hierarchy is then formulated in step 50 from the rankings so that the digital images are stored in such a manner that the highest ranked images are more easily accessed than the lower ranked images. In the example shown in FIG. 5, the decision was made to re-rank the digital image files because at least one digital image file (B) had a sufficiently higher score than another previously higher ranked image file (A). If that were not the case, i.e. no image file had a score that exceeded the score of a previously higher ranked digital image by the minimum threshold, then the decision would have been made not to re-rank the digital image files, and the process would return to step 46 to continue recording the user's access to, and use of, the digital image files.

In step 50, a new access hierarchy is created to store the higher ranked digital image and/or audio files in a manner that makes them more easily accessed than the lower ranked digital image files, e.g. because of latency due to access times, for example, to fast, local storage vs. remote archival storage. In the example shown in FIG. 5, only three images were discussed for the sake of simplicity. However, when many images are stored by a user it may become critical to reserve the most easily accessed data storage for the most highly valued images, while storing the less valued images in less accessible data storage.

Management of URL's in Web Navigation History

In another embodiment, the invention can be used as an alternative to the "Favorites" list in Web browsers. As a user navigates through a Web browsing session a record of the navigation history is made. In addition to a simple list of URL's for Web sites visited, the history preferably also includes the frequency with which each Web site was visited, the total number of visits, the duration of each visit, and the amount of time since the most recent visit to each Web site. The navigation history can further include a record of any Web sites from which data was downloaded and whether that data were edited or shared by the user.

The URL management embodiment also allows the user to have some direct influence on the ranking of digital assets by providing the user the option to assign personal scores to each URL in the navigation history. If the user elects not to assign a personal score a default score may be assigned to a URL. In one embodiment, the user is provided with an option to set a minimum differential threshold that must be exceeded for a re-ranking to occur. This feature enables the user to modulate the volatility in the re-ranking process.

A simplified illustration of the URL management embodiment of the invention is provided in FIG. 6. Three web sites A, B, and C are included in the Web navigation history. Two Web navigation sessions have been performed, session 1 and session 2. In session 1, Web site A was visited most recently one day ago and was visited at a frequency of four times per day for an average duration of five minutes for each visit, Data downloaded from Website A was edited or shared once during session 1. The user assigned the URL for Web site A a personal score of eight. The user-assigned personal score for each URL helps to determine a ranking of the URL's.

In the example illustrated in FIG. 6, the recency of a URL is factored by assigning ten points for a Web site visit on the day of the ranking, eight points for a one-day period since the last visit, six points for a two-day period since the last visit, four points for a three-day period, two points for a four-day period, and zero points for a five-day or greater period since the last visit. The average duration of each visit, in minutes, is multiplied by a factor of two for each minute. Thus, an average duration of five minutes for a visit to a Web site would contribute ten points to the score of the corresponding URL.

After Web navigation session 1, taking into account the recency, frequency, average duration of visits, whether data from the web sites was edited or shared, and the user-assigned personal scores of the Web sites, the ranking of the Web sites is as shown (total score in brackets): Web site A (56), Web site B (31.5), and Web site C (29).

The notion of a Web navigation session in this context can be used to describe a fixed period, for example one week or one day, at the end of which the ranking of Web sites is performed. In one embodiment, if a URL has not been activated within a predetermined period of time, for example one month, that URL is removed from the list of ranked URL's.

It is well known that the Web browsing habits of users change over time. Some of this change is seasonal, i.e. a Web site for ski conditions would not be accessed during the summer, and some of this has to do with trends and fads that come and go. At the end of the Web browsing session 2 in FIG. 6 it is evident that the user's Web browsing pattern has changed significantly. For example, the frequency of visits to Web site A decreased from four per day to 1.5 per day, whereas the frequency of visits to Web sites B and C increased from 0.5 per day to two per day, and one per day to five per day, respectively.

To modulate the volatility in the ranking of URL's in this embodiment of the invention, a volatility dampening procedure is provided. Unless the score of at least one URL exceeds the score of another previously higher ranked URL by a minimum threshold, the URL in the list is not re-ranked. In the example shown in FIG. 6, assuming the minimum threshold was a five point score differential, the URL's for Web sites A, B, and C is not re-ranked because the score differential between Web site A (45.5) and web sites B and C (both 49) is less than five. This serves the user by preserving a certain amount of familiarity in the order of the list. If the minimum threshold is exceeded, the order of the URL's in the list is rearranged. The URL's can be presented to the user as a drop down menu from a tool bar in the browser. In a preferred embodiment, the user can adjust the minimum threshold according to the user's tolerance for re-ranking volatility.

Figure 7:
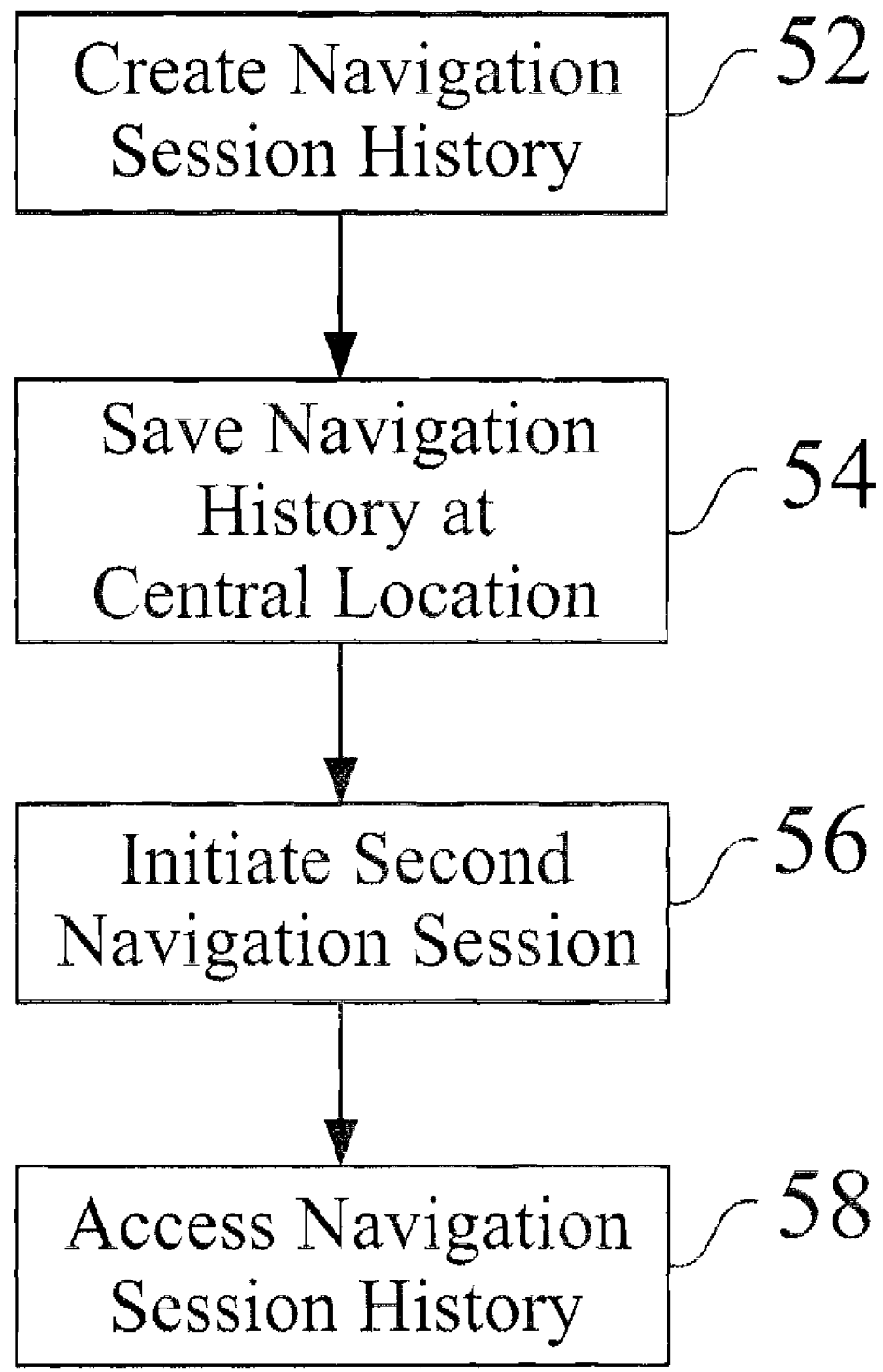
FIG. 7 is a flow diagram illustrating a preferred embodiment of the invention for managing URL's in a web navigation history.

Another embodiment of the invention is shown in FIG. 7. Users frequently employ any number of different network devices in different navigation sessions, The embodiment shown in FIG. 7 allows the user to benefit from the invention regardless of which network device is used. In the step 52, a navigation session history is created to reflect the URL's activated during a user's navigation session on a first network device. In addition to a simple list of activated URL's, the navigation history can include such information as the recency, number and frequency of access, whether the URL's were shared or transported, and the length of time spent at each Web page. In another embodiment, the navigation history created in the step 52 can include an access hierarchy of URLs. The access hierarchy can be based on frequency, recency, type of use, e.g. whether a page accessed by the URL is edited or shared, whether information is downloaded from the Web page, and the length of time spent at each Web page, as well as user assigned values provided for all or some of the URL's.

In the step 54, the navigation session history is saved to a commonly accessible location on a network. For example, with reference to FIG. 1, the navigation history can be saved to the server/router 16. In the step 56, a second navigation session is initiated at a second network device, and in the step 58 the navigation session history is downloaded to the second network device. During the second navigation session a navigation session history is once again created and recorded as in steps 42 and 54. As discussed previously, a volatility dampening measure can be employed to minimize volatility in re-ranking of URL's.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for managing digital assets, comprising the steps of:
   monitoring any of access and navigation to said digital assets by a user through at least one of a plurality of devices associated with a network;
   identifying one or more types of use of any of said accessed and navigated digital assets by said user associated with said monitoring step, wherein said types of use comprise any of visitation, playback, viewing, activation, sharing, transporting, and editing;
   assigning a score based on each identified type of use by said user associated with said monitoring step;
   ranking said accessed digital assets based on accumulation of said assigned scores of said digital assets; and
   providing an access hierarchy comprising any of hierarchical storage and hierarchical listing of said ranked digital assets in a memory based on said ranking step, wherein highly ranked digital assets are more easily accessed by the same said user than lower ranked digital assets, and wherein said memory is accessible to each of the plurality of devices over said network.

2. The method of claim 1, wherein said ranking step is based at least partially on any of recency of use, frequency of use, and number of uses of said digital assets.

3. The method of claim 1, wherein said ranking step further comprises the step of:
applying a user-assigned value when generating said access hierarchy.

4. The method of claim 1, further comprising the step of:
re-ranking said digital assets only if a score of a first digital asset exceeds a score of a second previously higher ranked digital asset by a predetermined threshold.

5. The method of claim 1, wherein at least one of said accessed digital assets comprise any of a digital image and a digital audio file.

6. The method of claim 1, wherein said transporting comprises any of transmitting and receiving said digital assets.

7. The method of claim 1, wherein said monitoring step comprises the step of:
monitoring a Web browser's navigation history.

8. The method of claim 7, further comprising the step of:
assigning a first score to a Uniform Resource Locator (URL) based on the length of time spent by said user visiting a Web page represented by said URL and a second score if said user downloads digital information from a Web site associated with said URL; and
wherein said ranking step further comprises the step of processing at least one of said first and said second scores.

9. The method of claim 7, further comprising the steps of:
assigning cumulative scores to a plurality of URL's activated by said user; and
re-ranking said plurality of URL's only if a cumulative score assigned to a first URL exceeds a cumulative score assigned to a second previously higher ranked URL by a predetermined threshold.

10. The method of claim 1, further comprising the step of:
sharing said access hierarchy with a plurality of networked devices.

11. The method of claim 10, wherein at least one of said networked devices comprises any of a computer, a CD player, an MP3 player, and a DVD player.

12. The method of claim 1, wherein said memory is any of resident of one of the devices, or distributed amongst a plurality of the devices.

13. A system for managing digital assets, comprising:
means for monitoring any of access and navigation to said digital assets by a user through at least one of a plurality of devices associated with a network;
means for identifying one or more types of use of any of said accessed or navigated digital assets by said user associated with said monitored access or navigation, wherein said types of use comprise any of visitation, passive playback, passive viewing, activation, sharing, transporting, and editing;
means for assigning a score based on each identified type of use by said user associated with said monitored access or navigation;
a ranking module in communication with said score assignment means to rank said digital assets based on accumulation of said assigned scores; and
means for providing an access hierarchy comprising any of hierarchical storage and hierarchical listing of said ranked digital assets in a memory based on said rank of said digital assets, whereby higher ranked digital assets are more easily accessed by the same said user than lower ranked digital assets and wherein said memory is accessible to each of the plurality of devices over said network.

14. The system of claim 13, wherein said digital assets comprise any of digital images and digital audio files.

15. The system of claim 14, wherein said ranking module assigns a first score to a first digital asset when said user accesses or navigates to said first digital asset for viewing and assigns a second score to a second digital asset if said user accesses or navigates to said second digital asset for editing.

16. The system of claim 13, wherein said ranking module ranks said digital assets at least in part based on user-assigned values.

17. The system of claim 13, wherein said ranking module comprises an inertia algorithm that prevents a re-ranking of said digital assets unless a score of a first digital asset exceeds a score of a second previously higher ranked digital asset by a predetermined threshold.

18. The system of claim 13, wherein said ranking module comprises an input for receiving data representative of use of said digital assets including any of frequency of use, recency of use, and number of uses of said digital assets, said ranking module being configured to factor in said data representative of said use.

19. The system of claim 13, wherein said digital assets comprise digital images, and wherein said transporting comprises any of transmitting and receiving of said digital images.

20. The system of claim 13, wherein said digital assets comprise URL's.

21. The system of claim 20, wherein said ranking module comprises an inertia algorithm that prevents a re-ranking of said URL's unless a score of at least one of said URL's exceeds a score of another of said URL's by a predetermined threshold.

22. The system of claim 13, wherein any of said access and navigation is provided through a device comprising any of a computer, a CD player, an MP3 player, and a DVD player.

23. A method for managing a list of uniform resource locators (URL's) that is automatically responsive to a Web navigation of a user, comprising the steps of:
creating a Web navigation history associated with one or more browsing sessions by said user through at least one of a plurality of devices associated with a network, wherein said navigation history comprises any of Web sites visited by said user, URL's activated by said user, URL's shared by said user, and URL's transported by said user;
identifying types of use by said user associated with said navigation history, wherein said types of use comprise any of visitation, activation, sharing, and transporting;
assigning scores corresponding to each identified type of use by said user of said URL's in said Web navigation history based on use of said URL's;
ranking said URLs based on accumulation of said assigned scores; and
providing an access hierarchy comprising any of hierarchical storage and hierarchical listing of said ranked URL's in a memory based on said ranking step, wherein higher ranked URL's are more easily accessed from said memory by the same said user than lower ranked URL's, and wherein said memory is accessible to each of the plurality of devices over said network.

24. The method of claim 23, wherein said access hierarchy of said ranked URL's is accessible through a plurality of said devices associated with said network over said one or more browsing sessions.

25. The method of claim 24, wherein at least one of said devices comprises any of a computer, a CD player, an MP3 player, and a DVD player.

26. The method of claim 23, wherein said step of creating a Web navigation history comprises recording the recency and frequency with which each of said URL's are activated.

27. The method of claim 23, wherein said step of creating said Web navigation history comprises the step of:
   determining whether data downloaded from Web sites corresponding to said URL's were edited or shared by said user.

28. The method of claim 23, further comprising the step of:
   receiving user-assigned values for each of said URL's, said step of assigning scores further comprising the step of factoring in said user-assigned values.

29. The method of claim 23, further comprising the steps of:
   updating said Web navigation history to record Web site site visits made by said user;
   assigning scores to each of said URL's in said updated Web navigation history based on said user's use of said URL's; and
   updating said access hierarchy if a score assigned to a first URL exceeds a score assigned to a second previously higher ranked URL by a predetermined threshold.

30. The method of claim 29, further comprising the step of:
   allowing said user to define said predetermined threshold.

* * * * *